(12) United States Patent
Tatsuno et al.

(10) Patent No.: US 9,236,193 B2
(45) Date of Patent: Jan. 12, 2016

(54) SOLID ELECTROLYTIC CAPACITOR FOR USE UNDER HIGH TEMPERATURE AND HUMIDITY CONDITIONS

(71) Applicant: AVX Corporation, Fountain Inn, SC (US)

(72) Inventors: Jyunya Tatsuno, Shiga (JP); Kiyofumi Aoki, Shiga (JP)

(73) Assignee: AVX Corporation, Fountain Inn, SC (US)

( * ) Notice: Subject to any disclaimer, the term of this patent is extended or adjusted under 35 U.S.C. 154(b) by 197 days.

(21) Appl. No.: 14/044,290

(22) Filed: Oct. 2, 2013

(65) Prior Publication Data

US 2015/0092319 A1 Apr. 2, 2015

(51) Int. Cl.
| | |
|---|---|
| H01G 9/02 | (2006.01) |
| H01G 9/04 | (2006.01) |
| H01G 9/10 | (2006.01) |
| H01G 9/00 | (2006.01) |
| H01G 9/028 | (2006.01) |
| H01G 9/15 | (2006.01) |

(52) U.S. Cl.
CPC ............... *H01G 9/10* (2013.01); *H01G 9/0003* (2013.01); *H01G 9/028* (2013.01); *H01G 9/15* (2013.01)

(58) Field of Classification Search
USPC .......................................... 361/523, 525, 528
See application file for complete search history.

(56) References Cited

U.S. PATENT DOCUMENTS

| | | | |
|---|---|---|---|
| 4,910,645 A | 3/1990 | Jonas et al. | |
| 5,424,907 A | 6/1995 | Kojima et al. | |
| 5,457,862 A | 10/1995 | Sakata et al. | |
| 5,473,503 A | 12/1995 | Sakata et al. | |
| 5,586,000 A | 12/1996 | Sakata et al. | |
| 5,694,287 A | 12/1997 | Nishiyama et al. | |
| 5,729,428 A | 3/1998 | Sakata et al. | |
| 5,812,367 A | 9/1998 | Kudoh et al. | |
| 6,072,694 A * | 6/2000 | Hahn et al. | 361/523 |
| 6,528,662 B2 | 3/2003 | Jonas | |
| 6,635,729 B1 | 10/2003 | Groenendaal et al. | |
| 6,639,787 B2 | 10/2003 | Kimmel et al. | |

(Continued)

FOREIGN PATENT DOCUMENTS

| | | |
|---|---|---|
| GB | 2 447 729 A | 9/2008 |
| WO | WO 2012/041506 A2 | 4/2012 |

(Continued)

OTHER PUBLICATIONS

Abstract of Japanese Publication—JP2010161429 dated Jul. 22, 2010, 2 pages.

(Continued)

*Primary Examiner* — Eric Thomas
(74) *Attorney, Agent, or Firm* — Dority & Manning, P.A.

(57) ABSTRACT

A solid electrolytic capacitor that is capable of exhibiting good electrical properties even under the extreme conditions of high temperature and humidity levels is provided. More particularly, the capacitor contains a capacitor element that includes a sintered porous anode body, a dielectric that overlies the anode body, and a solid electrolyte that overlies the dielectric. The solid electrolyte contains a conductive polymer and an organometallic coupling agent. The capacitor also contains a moisture barrier layer that overlies the solid electrolyte and is formed from a hydrophobic elastomer that has a low surface energy such that it is not readily wettable by an aqueous medium.

28 Claims, 1 Drawing Sheet

(56) References Cited

U.S. PATENT DOCUMENTS

| | | | |
|---|---|---|---|
| 6,674,635 B1 | 1/2004 | Fife et al. | |
| 6,798,644 B1 | 9/2004 | Piller et al. | |
| 6,853,540 B2 | 2/2005 | Kudoh et al. | |
| 6,987,663 B2 | 1/2006 | Merker et al. | |
| 7,154,740 B2 | 12/2006 | Merker et al. | |
| 7,180,728 B2 | 2/2007 | Kobayashi | |
| 7,221,554 B2 | 5/2007 | Brenneman et al. | |
| 7,248,461 B2 | 7/2007 | Takagi et al. | |
| 7,262,511 B2 | 8/2007 | Osaka et al. | |
| 7,279,015 B2 | 10/2007 | Merker | |
| 7,377,947 B2 | 5/2008 | Merker et al. | |
| 7,411,779 B2 | 8/2008 | Merker et al. | |
| 7,515,396 B2 | 4/2009 | Biler | |
| 7,554,793 B2 | 6/2009 | Chacko | |
| 7,563,290 B2 | 7/2009 | Qiu et al. | |
| 7,585,983 B2 | 9/2009 | Reuter et al. | |
| 7,785,493 B2 | 8/2010 | Jonas et al. | |
| 7,800,887 B2 | 9/2010 | Iida et al. | |
| 7,821,772 B2 | 10/2010 | Kobayashi et al. | |
| 7,990,683 B2 | 8/2011 | Qiu et al. | |
| 8,035,953 B2 | 10/2011 | Nemoto et al. | |
| 8,050,014 B2 | 11/2011 | Iwasa et al. | |
| 8,057,553 B2 | 11/2011 | Iwasa et al. | |
| 8,058,135 B2 | 11/2011 | Merker et al. | |
| 8,094,434 B2 | 1/2012 | Rawal et al. | |
| 8,194,395 B2 | 6/2012 | Zednicek et al. | |
| 8,228,664 B2 | 7/2012 | Yamaguchi et al. | |
| 8,279,584 B2 | 10/2012 | Zednickova | |
| 8,308,825 B2 | 11/2012 | Freeman et al. | |
| 8,310,815 B2 | 11/2012 | Freeman et al. | |
| 8,313,538 B2 | 11/2012 | Merker et al. | |
| 8,323,361 B2 | 12/2012 | Freeman et al. | |
| 8,349,030 B1 | 1/2013 | Hussey et al. | |
| 8,422,201 B2 | 4/2013 | Harada et al. | |
| 8,437,117 B2 | 5/2013 | Umemoto et al. | |
| 8,456,803 B2 | 6/2013 | Merker et al. | |
| 8,470,389 B2 | 6/2013 | Furukawa et al. | |
| 8,503,167 B2 | 8/2013 | Ota et al. | |
| 2010/0157510 A1 | 6/2010 | Miyachi et al. | |
| 2010/0172068 A1 | 7/2010 | Yoshimitsu | |
| 2010/0328847 A1* | 12/2010 | Umemoto et al. | 361/525 |
| 2011/0019339 A1 | 1/2011 | Merker et al. | |
| 2012/0057275 A1 | 3/2012 | Intelmann et al. | |
| 2012/0063063 A1 | 3/2012 | Qiu et al. | |
| 2012/0097897 A1 | 4/2012 | Guntermann et al. | |
| 2012/0106031 A1 | 5/2012 | Vilc et al. | |
| 2012/0134074 A1 | 5/2012 | Abe et al. | |
| 2013/0261261 A1 | 10/2013 | Lövenich | |
| 2013/0295389 A1 | 11/2013 | Ishikawa et al. | |

FOREIGN PATENT DOCUMENTS

| | | |
|---|---|---|
| WO | WO 2012/041506 A3 | 4/2012 |
| WO | WO 2012/048824 A1 | 4/2012 |
| WO | WO 2012/119711 A1 | 9/2012 |
| WO | WO 2012/136305 A1 | 10/2012 |

OTHER PUBLICATIONS

Search Report for GB1415481.9 dated Apr. 20, 2015, 3 pages.
Abstract of Japanese Patent—JP2001257130, Sep. 21, 2001, 2 pages.
Abstract of Japanese Patent—JP2010090397, Apr. 22, 2010, 1 page.
Abstract of Japanese Patent—JPH01140621, Jun. 1, 1989, 1 page.
Abstract of Japanese Patent—JPH03109712, May 9, 1991, 2 pages.
Abstract of Japanese Patent—JPH03109713, May 9, 1991, 2 pages.
Abstract of Japanese Patent—JPH03109714, May 9, 1991, 2 pages.
Abstract of Japanese Patent—JPH03127813, May 30, 1991, 1 page.
Abstract of WO Patent—WO2010015468, Feb. 11, 2010, 1 page.
Product Information on Nanocyl™ NC7000 Series—Thin Multi-Wall Carbon Nanotubes from Nanocyl S.A., Mar. 10, 2009, 1 page.
Paper—Freeman et al., "Electrical Characterization of Polymer Tantalum Capacitors with Poly(3,4-Ethylenedioxythiophene) Cathode," Journal of the Electrochemical Society, vol. 156, No. 6, 2009, 10 pages and CARTS Europe 2008, Helsinki, Finland, Oct. 20-23, 2008.
Paper—Freeman et al., "How Far We Can Go with Hi CV Ta Capacitors," CARTS Europe 2004, $18^{th}$ Annual Passive Components Conference, Oct. 18-21, 2004.
Paper—Freeman et al, "How High Working Voltage Can Go in Polymer Tantalum Capacitors," CARTS USA 2011, Jacksonville, Florida, Mar. 28-31, 2011, 15 pages.
Paper—Freeman et al., "Low Voltage CV Loss in Tantalum Capacitors," CARTS USA 2010, New Orleans, LA, Mar. 16, 2010, 12 pages.
Paper—Freeman et al., "Reliability and Critical Applications of Tantalum Capacitors," CARTS Europe 2007 Symposium, Oct.-Nov. 2007, Barcelona, Spain, pp. 193-204.
Paper—Freeman, et al., "Stable, Reliable, and Efficient Tantalum Capacitors," CARTS USA 2008, $28^{th}$ Symposium, for Passive Electronics, March, Newport Beach, California, 6 pages.
Paper—Merker et al., "Conducting Polymer Dispersions for High-Capacitance Tantalum Capacitors,": CARTS Europe 2006, Sep. 2006, Bad Homburg, Germany, 6 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Paper—Petrzilek et al., "Next Generation of High Voltage, Low ESR Tantalum Conductive Polymer Capacitors," *CARTS USA 2011*, Jacksonville, Florida, Mar. 28-31, 2011, 9 pages.
Paper—Simpson et al., "Advances and Applications of Inherently Conductive Polymer Technologies Based on Poly(3,4-Ethylenedioxythiophene)," 2005 AIMCAL Fall Technical Conference and $19^{th}$ International Vacuum Web Coating Conference, Oct. 16-20, 2005, Session 5: Advances in Technology, Myrtle Beach, SC, 10 pages.
Paper—Young et al., "High Voltage Tantalum Polymer Capacitors," CARTS Europe 2008, Helsinki, Finland, Oct. 20-23, 2008.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Presentation—Freeman et al., "Hermetically Sealed Polymer Tantalum Capacitors," CMSE Europe 2010.

* cited by examiner

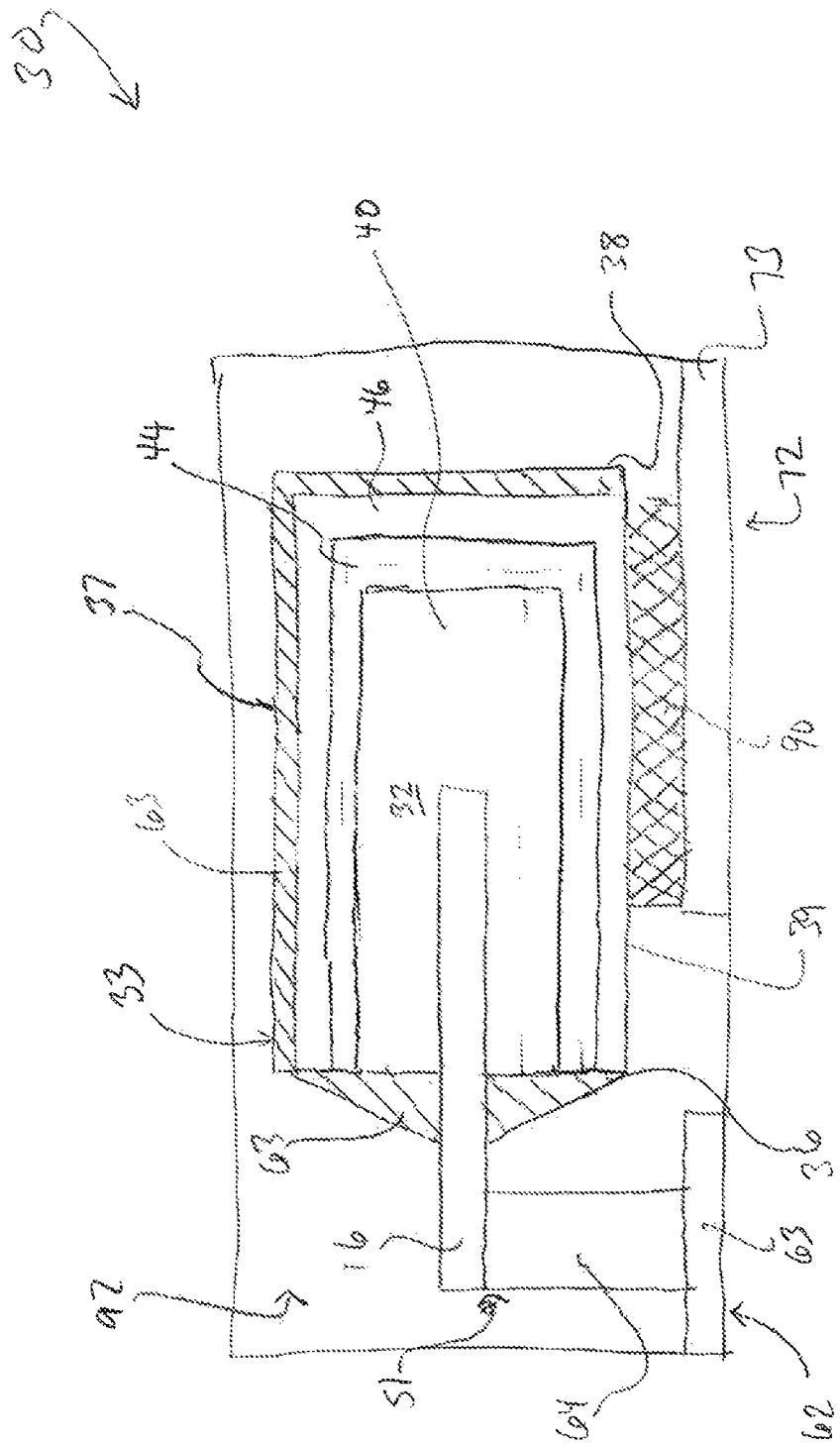

SOLID ELECTROLYTIC CAPACITOR FOR USE UNDER HIGH TEMPERATURE AND HUMIDITY CONDITIONS

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes a tantalum anode, dielectric layer, and conductive polymer solid electrolyte. To help protect the capacitor from the exterior environment and provide it with good mechanical stability, it is typically encapsulated with an epoxy resin. While such epoxy resins are suitable in most environments, they can nevertheless become problematic in certain circumstances. For example, certain types of conductive polymer electrolytes (e.g., PEDT) are highly sensitive due to the tendency of such polymers to readily oxidize in the presence of moisture. Unfortunately, the presence of a very high level of moisture (e.g., about 85% relative humidity or more) in the ambient environment can cause the epoxy resin to slowly weaken or degrade, which may eventually allow a small amount of moisture to penetrate into the interior of the capacitor. Even in a small amount, the moisture can lead to a rapid deterioration of the electrical properties. As such, a need currently exists for a capacitor that has improved performance in high humidity environments.

SUMMARY OF THE INVENTION

In accordance with one embodiment of the present invention, a solid electrolytic capacitor is disclosed that comprises a capacitor element that includes a sintered porous anode body, a dielectric that overlies the anode body, a solid electrolyte that overlies the dielectric, and a moisture barrier layer that overlies the solid electrolyte. The solid electrolyte includes a conductive polymer and an organometallic coupling agent that contains an organic chain with at least one reactive group bonded to a metal atom, and further wherein the moisture barrier layer includes a hydrophobic elastomer. The capacitor also contains an anode termination that is in electrical connection with the anode body and a cathode termination that is in electrical connection with the solid electrolyte. A resinous casing encapsulates the capacitor element and leaves exposed at least a portion of the anode termination and the cathode termination.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended FIGURE in which:

FIG. 1 is a schematic illustration of one embodiment of a capacitor that may be formed in accordance with the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that is capable of exhibiting good electrical properties even under the extreme conditions of high temperature and humidity levels. More particularly, the capacitor contains a capacitor element that includes a sintered porous anode body, a dielectric that overlies the anode body, and a solid electrolyte that overlies the dielectric. The solid electrolyte contains a conductive polymer and an organometallic coupling agent. The capacitor also contains a moisture barrier layer that overlies the solid electrolyte and is formed from a hydrophobic elastomer that has a low surface energy such that it is not readily wettable by an aqueous medium. For example, the hydrophobic elastomer may have an advancing and/or receding contact angle with water of about 90° or more, in some embodiments about 100° or more, and in some embodiments, about 120° or more, such as determined in accordance with ASTM D7490-08. The hydrophobic elastomer may also have a relatively low water vapor transmission rate, such as about 150 grams per square meter per 24 hours ("g/m$^2$/24 hrs") or less, in some embodiments about 100 g/m$^2$/24 hrs or less, and in some embodiments, from about 0 to about 50 g/m$^2$/24 hrs, such as determined in accordance with ASTM F-1249. The present inventors have discovered that the unique combination of the features above can result in a capacitor that is capable of exhibiting excellent performance under the conditions of both high temperature and high humidity.

Various embodiments of the invention will now be described in more detail.

I. Capacitor Element

A. Anode Body

The anode body may be formed from a powder having a specific charge of from about 2,000 microFarads*Volts per gram ("μF*V/g") to about 350,000 μF*V/g. As is known in the art, the specific charge may be determined by multiplying capacitance by the anodizing voltage employed, and then dividing this product by the weight of the electrode body prior to anodization. In certain embodiments, the powder may have a high specific charge, such as about 70,000 μF*V/g or more, in some embodiments about 80,000 μF*V/g or more, in some embodiments about 90,000 μF*V/g or more, in some embodiments from about 100,000 to about 300,000 μF*V/g, and in some embodiments, from about 120,000 to about 250,000 μF*V/g. Of course, the powder may also have a low specific charge, such as about 70,000 μF*V/g or less, in some embodiments about 60,000 μF*V/g or more, in some embodiments about 50,000 μF*V/g or more, in some embodiments from about 2,000 to about 40,000 μF*V/g, and in some embodiments, from about 5,000 to about 35,000 μF*V/g.

The powder may contain individual particles and/or agglomerates of such particles. Compounds for forming the powder include a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be NbO$_{0.7}$, NbO$_{1.0}$, NbO$_{1.1}$, and NbO$_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No.

6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, al., as well as U.S. Patent Application Publication Nos. 2005/0019581 to Schnitter; 2005/0103638 to Schnitter, et al.; 2005/0013765 to Thomas, et al.

The powder may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the highly reactive coarse agglomerates may be passivated by gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

To facilitate the construction of the anode body, certain components may also be included in the powder. For example, the powder may be optionally mixed with a binder and/or lubricant to ensure that the particles adequately adhere to each other when pressed to form the anode body. Suitable binders may include, for instance, poly(vinyl butyral); poly (vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

After compaction, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. The pressed density of the pellet after sintering may vary, but is typically from about 2.0 to about 7.0 grams per cubic centimeter, in some embodiments from about 2.5 to about 6.5, and in some embodiments, from about 3.0 to about 6.0 grams per cubic centimeter. The pressed density is determined by dividing the amount of material by the volume of the pressed pellet.

Although not required, the thickness of the anode body may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al.

B. Dielectric

The anode body is also coated with a dielectric. The dielectric may be formed by anodically oxidizing ("anodizing") the sintered porous anode body so that a dielectric layer is formed over and/or within the body. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V. and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Solid Electrolyte

As indicated above, the solid electrolyte includes a conductive polymer in combination with an organometallic coupling agent. The conductive polymer is typically π-conjugated and has electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

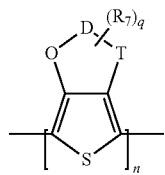

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

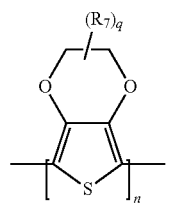

Methods for forming conductive polymers, such as described above, are well known in the art. For instance, U.S. Pat. No. 6,987,663 to Merker, et al., describes various techniques for forming substituted polythiophenes from a monomeric precursor. The monomeric precursor may, for instance, have the following structure:

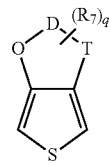

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

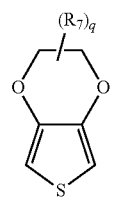

wherein, $R_7$ and q are as defined above. In one particular embodiment, "q" is 0. One commercially suitable example of 3,4-ethylenedioxthiophene is available from Heraeus Precious Metals GmbH & Co. KG under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The conductive polymer may be formed in situ or pre-polymerized and then applied to the anode body in the form of a dispersion. To form an in situ polymerized layer, the monomer may be chemically polymerized, optionally in the presence of an oxidative catalyst. The oxidative catalyst typically includes a transition metal cation, such as iron(III), copper (II), chromium(VI), cerium(IV), manganese(IV), manganese (VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Precious Metals GmbH & Co. KG under the designation Clevios™ C.

The oxidative catalyst and monomer may be applied either sequentially or together to initiate the polymerization reaction. Suitable application techniques for applying these components include screen-printing, dipping, electrophoretic coating, and spraying. As an example, the monomer may initially be mixed with the oxidative catalyst to form a precursor solution. Once the mixture is formed, it may be applied to the anode part and then allowed to polymerize so that a conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

The organometallic coupling agent that is employed in the solid electrolyte typically contains an organic chain with at least one reactive functional group bonded to a metal atom, such as silicon, titanium, aluminum, vanadium, niobium, manganese, magnesium, and so forth. Examples of suitable organometallic coupling agents may include, for instance, organosilanes, such as alkoxysilanes (e.g. vinyltrimethoxysilane, vinyltriethoxysilane, vinylmethyldimethoxysilane, vinylmethyldiethoxysilane, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, 3-mercaptopropylmethyldiethoxysilane, glycidoxymethyltrimethoxysilane, glycidoxymethyltriethoxysilane, glycidoxymethyltripropoxysilane, glycidoxymethyltributoxysilane, β-glycidoxyethyltrimethoxysilane, β-glycidoxyethyltriethoxysilane, β-glycidoxyethyl-tripropoxysilane, β-glycidoxyethyltributoxysilane, β-glycidoxyethyltrimethoxysilane, α-glycidoxyethyltriethoxysilane, α-glycidoxyethyltripropoxysilane, α-glycidoxyethyltributoxysilane, γ-glycidoxypropyl-trimethoxysilane, γ-glycidoxypropyltriethoxysilane, γ-glycidoxypropyl-trimethoxysilane, γ-glycidoxypropyltributoxysilane, γ-glycidoxypropyltripropoxysilane, γ-glycidoxypropyltributoxysilane, β-glycidoxypropyl-trimethoxysilane, β-glycidoxypropyl-triethoxysilane, β-glycidoxypropyltripropoxysilane, α-glycidoxypropyltributoxysilane, α-glycidoxypropyltrimethoxysilane, α-glycidoxypropyltriethoxysilane, α-glycidoxypropyltripropoxysilane, α-glycidoxypropyltributoxysilane, γ-glycidoxybutyl-trimethoxysilane, δ-glycidoxybutyltriethoxysilane, δ-glycidoxybutyltripropoxysilane, δ-glycidoxybutyl-tributoxysilane, δ-glycidoxybutyltrimethoxysilane, γ-glycidoxybutyltriethoxysilane, γ-glycidoxybutyltripropoxysilane, γ-propoxybutyltributoxysilane, δ-glycidoxybutyl-trimethoxysilane, δ-glycidoxybutyltriethoxysilane, δ-glycidoxybutyltripropoxysilane, α-glycidoxybutyltrimethoxysilane, α-glycidoxybutyltriethoxysilane, α-glycidoxybutyltripropoxysilane, α-glycidoxybutyltributoxysilane, (3,4-epoxycyclohexyl)-methyl-trimethoxysilane, (3,4-epoxycyclohexyl)methyl-triethoxysilane, (3,4-epoxycyclohexyl)methyltripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyltripropoxysilane, (3,4-epoxycyclohexyl)ethyltributoxysilane, (3,4-epoxycyclohexyl)propyltrimethoxysilane, (3,4-epoxycyclohexyl)propyltriethoxysilane, (3,4-epoxycyclohexyl)propyl-tripropoxysilane, (3,4-epoxycyclohexyl)propyltributoxysilane, (3,4-epoxycyclohexyl)butyltrimethoxysilane, (3,4-epoxycyclohexyl)butyltriethoxysilane, (3,4-epoxycyclohexyl)butyltripropoxysilane, (3,4-epoxycyclohexyl)butyltributoxysilane, etc.) and alkylsilanes (e.g. vinyltrichlorosilane, vinylmethyldichlorosilane, etc.); organotitanates, such as bis(cyclopentadienyl)titanium bis(trifluoromethanesulfonate), chlorotriisopropoxytitanium, diisopropoxytitanium bis(acetylacetonate), 3-hydroxy-1,2-propanedioxytitanium dichloride, tetrakis(diethylamido) titanium, titanium bis(ammonium lactato)dihydroxide, titanium butoxide, titanium isopropoxide, isopropyl triisostearoyl titanate, isopropyl tris(dioctyl pyrophosphite)titanate, isopropyl tri(N-aminoethylaminoethyl)titanate, isopropyl tridecyl benzene sulfonyl titanate, tetraoctyl bis(ditridecyl phosphite)titanate, tetra(2,2-diaryloxymethyl-1-butyl)-bis (di-tridecyl)phosphite titanate, bis(dioctyl pyrophosphate) oxyacetate titanate, bis(dioctyl pyrophosphate)ethylene titanate, isopropyl trioctanoyl titanate, isopropyl dimethacryl isostearoyl titanate, isopropyl tricumyl phenyl titanate, etc.); organoaluminum, such as aluminum acetylacetonate, aluminum butoxide, aluminum isopropoxide, aluminum monostearate, acetal alkoxy aluminum diisopropylate; and so forth. Silane coupling agents may be particularly suitable for use in the present invention.

The particular manner in which the organometallic coupling agent is incorporated into the solid electrolyte may vary as desired. In certain embodiments, for example, the organometallic coupling agent may be formed as a separate layer from a conductive polymer layer. For instance, the organometallic coupling agent may be overly the dielectric and a conductive polymer layer may overly the organometallic coupling agent, or vice versa. In one particular embodiment, the coupling agent is dissolved in an organic solvent and applied to the part as a solution, such as by screen-printing, dipping, electrophoretic coating, spraying, etc. The part may then be dried to remove the solvent therefrom and form a layer of the organometallic coupling agent. Of course, in yet other embodiments, the conductive polymer and organometallic coupling agent may be contained within the same layer. For instance, this may be accomplished by adding the organometallic coupling agent to a solution containing the monomer and/or oxidative catalyst, such as described above.

D. Cathode Coating

If desired, the capacitor element may also contain a cathode coating that overlies the solid electrolyte and includes at least one carbonaceous layer and/or at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc.

E. Moisture Barrier layer

As noted above, the moisture barrier layer overlies the solid electrolyte and optionally the cathode coating, when employed. The moisture barrier layer is generally formed from a hydrophobic elastomer, such as silicones, fluoropolymers, etc. Silicone elastomers are particularly suitable for use in the moisture barrier layer of the present invention. Such elastomers are typically derived from polyorganosiloxanes, such as those having the following general formula:

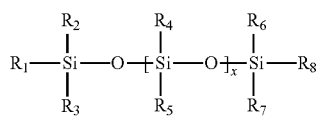

wherein, x is an integer greater than 1; and $R_1$, $R_2$, $R_3$, $R_4$, $R_5$, $R_6$, $R_7$, and $R_8$ are independently monovalent groups typically containing from 1 to about 20 carbon atoms, such as alkyl groups (e.g., methyl, ethyl, propyl, pentyl, octyl, undecyl, octadecyl, etc.); alkoxy groups (e.g., methoxy, ethoxy, propoxy, etc.); carboxyalkyl groups (e.g., acetyl); cycloalkyl groups (e.g., cyclohexyl); alkenyl groups (e.g., vinyl, allyl, butenyl, hexenyl, etc.); aryl groups (e.g., phenyl, tolyl, xylyl, benzyl, 2-phenylethyl, etc.); and halogenated hydrocarbon groups (e.g., 3,3,3-trifluoropropyl, 3-chloropropyl, dichlorophenyl, etc.). Examples of such polyorganosiloxanes may include, for instance, polydimethylsiloxane ("PDMS"), polymethylhydrogensiloxane, dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, fluoro-modified polysiloxane, etc. To form an elastomer, the polyorganosiloxane may be crosslinked using any of a variety of known techniques, such as by catalyst curing (e.g., platinum catalysts), room temperature vulcanization, moisture curing, etc. Crosslinking agents may be employed, such as alkoxy silanes having the formula Si—OR, wherein R is H, alkyl (e.g., methyl), alkenyl, carboxyalkyl (e.g., acetyl), and so forth.

In addition to being hydrophobic, it is generally desired that the material used to form the moisture barrier layer has a relatively low modulus and a certain degree of flexibility, which can help absorb some of the thermal stresses caused by expansion of the casing and also allow it to be subjected to compressive forces. The flexibility of the material may be characterized by a corresponding low modulus of elasticity ("Young's modulus"), such as about 5,000 kilopascals ("kPa") or less, in some embodiments from about 1 to about 2,000 kPa, and in some embodiments, from about 2 to about 500 kPa, measured at a temperature of about 25° C. The material also typically possesses a certain degree of strength that allows it to retain its shape even when subjected to compressive forces. For example, the material may possess a tensile strength of from about 1 to about 5,000 kPa, in some embodiments from about 10 to about 2,000 kPa, and in some embodiments, from about 50 to about 1,000 kPa, measured at a temperature of about 25° C. With the conditions noted above, the hydrophobic elastomer can even further enhance the ability of the capacitor to function under extreme conditions.

To help achieve the desired flexibility and strength properties, a non-conductive filler may be employed in the moisture barrier layer. When employed, such additives typically constitute from about 0.5 wt. % to about 30 wt. %, in some embodiments from about 1 wt. % to about 25 wt. %, and in some embodiments, from about 2 wt. % to about 20 wt. % of the moisture barrier layer. The silicone elastomer may constitute from about 70 wt. % to about 99.5 wt. %, in some embodiments from about 75 wt. % to about 99 wt. %, and in some embodiments, from about 80 wt. % to about 98 wt. % of the moisture barrier layer. One particular example of such a filler includes, for instance, silica. While most forms of silica contain a relatively hydrophilic surface due to the presence of silanol groups (Si—OH), the silica may optionally be surface treated so that its surface contains $(CH_3)_n$—Si— groups, wherein n is an integer of 1 to 3, which further enhances the hydrophobicity of the moisture barrier layer. The surface treatment agent may, for example, be an organosilicon compound monomer having a hydrolyzable group or a partial hydrolyzate thereof. Examples of such compounds may include organosilazanes, silane coupling agents such as described above, etc.

Generally speaking, the moisture barrier layer may be applied to any surface of the capacitor to provide the desired properties. For example, the moisture barrier layer may be located on the top, bottom, and/or side surfaces of the capacitor. The moisture barrier layer may likewise be located on the front and/or rear surface of the capacitor. The moisture barrier layer may cover the entire area or only a portion of the area of the surface to which it is applied. In one embodiment, for example, the moisture barrier layer covers about 30% or more, in some embodiments about 40% or more, and in some embodiments, about 50% or more of a surface of the capacitor to which it is applied.

Referring to FIG. 1, for example, one embodiment of a capacitor 30 is shown that contains a capacitor element 33 having a generally rectangular shape and contains a front surface 36, rear surface 38, top surface 37, bottom surface 39, first side surface 32, and second side surface (not shown). In the illustrated embodiment, an anode lead 16 is embedded within an anode body 40 and extends from the front surface 36 of the capacitor element 33 in a longitudinal direction ("y" direction). The capacitor element 33 contains a dielectric (not shown) that overlies the anode body 40, solid electrolyte 44 that overlies that dielectric, and cathode coating 46 that overlies the solid electrolyte 44. As shown, the solid electrolyte 44 and cathode coating 46 are typically present at each surface of the capacitor 30 except for the front surface 36. Of course, it should be understood that such layers may be applied to any surface of the capacitor, and need not be applied in the manner illustrated.

The capacitor element 33 also contains a moisture barrier layer 63 formed according to the present invention, which includes a hydrophobic material. In this particular embodiment, the moisture barrier layer 63 overlies the solid electrolyte 44 at the rear surface 38, top surface 37, as well as the side surfaces (not shown). The moisture barrier layer 63 is also present at the front surface 36, although it may not necessarily overly the solid electrolyte at this surface as noted above. Of course, it should be understood that the moisture barrier layer 63 need not be located on the surfaces of the capacitor element 33 as shown in FIG. 1. In another embodiment, for example, the moisture barrier layer may be located only at the side surfaces of the capacitor element 33. Regardless of the where it is located, the moisture barrier layer may cover any desired portion of the surface. For example, the moisture barrier layer may cover substantially all of the surfaces on which they are located, such as about 90% or more, and in some embodiments, about 95% or more. Once again, however, this is merely optional and the layer need not cover such a substantial portion of the surface.

F. Other Layers

If desired, the capacitor element may also contain other layers as is known in the art. For instance, a discontinuous precoat layer may be employed between the dielectric and solid electrolyte. The precoat layer may contain a plurality of discrete nanoprojections of a manganese oxide (e.g., manganese dioxide). For example, the small size of the discrete nanoprojections allows them to more readily penetrate into the small pores of the anode body. When deposited on the dielectric, the nanoprojections can also become embedded into the conductive polymer as it is formed, which can enhance adhesion between the dielectric and the conductive polymer. Because the precoat layer is formed as discrete nanoprojections rather than as a continuous layer, the conductive polymer may be able to directly contact a substantial portion of the dielectric, either directly or through contact with another layer. The relatively large degree of contact between the conductive polymer and dielectric can even further reduce ESR. To accomplish the desired result without adversely impacting the overall performance of the capacitor, the average size (e.g., diameter) of the nanoprojections is typically large enough so that an improvement in adhesion is achieved, but yet not so large that they are incapable of penetrating into the pores of the anode. In this regard, the nanoprojections typically have an average size of from about 5 nanometers to about 500 nanometers, in some embodiments from about 6 nanometers to about 250 nanometers, in some embodiments, from about 8 nanometers to about 150 nanometers, and in some embodiments, from about 10 nanometers to about 110 nanometers. The term "average diameter" may, for example, refer to the average value for the major axis of the nanoprojections when viewed from above (the maximum diameter). Such diameters may be obtained, for example, using known techniques, such as photon correlation spectroscopy, dynamic light scattering, quasi-elastic light scattering, etc. Various particle size analyzers may be employed to measure the diameter in this manner. One particular example is a Corouan VASCO 3 Particle Size Analyzer. Although not necessarily required, the nanoprojections may also have a narrow size distribution, which may further improve the properties of the capacitor. For instance, about 50% or more, in some embodiments about 70% or more, and in some embodiments, about 90% or more of the nanoprojections may have an average size within the ranges noted above. The number of nanoprojections having a certain size may be determined using the techniques noted above, wherein the percent volume can be correlated to the number of particles having a certain absorbance unit ("au").

In addition to their size, the surface coverage of the nanoprojections on the dielectric may also be selectively controlled to help achieve the desired electrical performance. That is, too small of a surface coverage may limit the ability to the conductive polymer layer to better adhere to the dielectric, but too large of a coverage may adversely impact the ESR of the capacitor. In this regard, the surface coverage of the nanoprojections is typically from about 0.1% to about 40%, in some embodiments from about 0.5% to about 30%, and in some embodiments, from about 1% to about 20%. The degree of surface coverage may be calculated in a variety of ways, such as by dividing the "actual capacitance" value by the "normal capacitance" value and then multiplying by 100. The "normal capacitance" is determined after forming the nanoprojections and then impregnating the anode with the conductive polymer solution, while the "actual capacitance" is determined after forming the nanoprojections, impregnating the anode with the conductive polymer solution, washing the conductive polymer solution from the interior of the anode, and then drying the anode to remove moisture.

A variety of different techniques may be employed to form the precoat layer of the present invention. As is known in the art, manganese oxides (e.g., manganese dioxide) are typically formed through pyrolytic decomposition of a precursor (e.g., manganese nitrate ($Mn(NO_3)_2$)), such as described in U.S. Pat. No. 4,945,452 to Sturmer, et al. For example, a dielectric-coated anode body may be contacted with a solution (e.g., dipped, immersed, sprayed, etc.) that contains the precursor and thereafter heated for conversion into the oxide. If desired, multiple application steps may be employed. The amount of time in which the anode body is in contact with a manganese oxide precursor solution may vary as desired. For example, the anode body may be dipped into such a solution for a period of time ranging from about 10 seconds to about 10 minutes.

The manganese oxide precursor solution may optionally contain a surfactant. Without intending to be limited by theory, it is believed that such a surfactant can reduce surface tension and thereby improve penetration of the solution into the interior of the anode body. Particularly suitable are nonionic surfactants, such as a polyglycol ether (e.g., polyoxyethylene alkyl ether), nonylphenoxypoly-(ethyleneoxy)ethanol (e.g., Igepal CO-630); isooctylphenoxypolyethoxyethanol (e.g., Triton X-100), benzyletheroctylphenol-ethylene oxide condensate (e.g., Triton CF-10), 3,6-dimethyl-4-octyne-3,6-diol (e.g., Surfynol 82), and so forth. To achieve the desired improvement in the impregnation of the manganese oxide precursor without adversely impacting other characteristics of the capacitor, it is generally desired that the concentration of the surfactant is selectively controlled within a certain range. For example, the solution into which the anode body is dipped may contain the surfactant in an amount of from about 0.01 wt. % to about 30 wt. %, in some embodiments from about 0.05 wt. % to about 25 wt. %, and in some embodiments, from about 0.1 wt. % to about 20 wt. %. The precursor(s) (e.g., manganese nitrate) may likewise constitute from about 1 wt. % to about 55 wt. % in some embodiments from about 2 wt. % to about 15 wt. %, and in some embodiments, from about 5 wt. % to about 10 wt. %, of the solution. A carrier, such as water, may also be employed in the solution. Aqueous solutions of the present invention may, for instance, contain water in an amount of from about 30 wt. % to about 95 wt. %, in some embodiments from about 40 wt. % to about 99 wt. % and in some embodiments, from about 50 wt. % to about 95 wt. %. It should be understood that the actual amounts of the components in the solution may vary depending upon such factors as the particle size and distribution of particles in the anode, the temperature at which decomposition is performed, the identity of the dispersant, the identity of the carrier, etc.

If desired, the anode body may be contacted with a humidified atmosphere in a pretreatment step that occurs prior to contact with a manganese oxide precursor solution. Without intending to be limited by theory, the present inventors believe that the presence of a certain amount of water vapor can slow the thermal decomposition reaction of manganese dioxide, thereby causing it to form as dispersed nanoprojections. For example, during the pretreatment step, the anode body can be exposed to an atmosphere having a humidity level of from about 1 to about 30 grams of water per cubic meter of air ($g/m^3$), in some embodiments from about 4 to about 25 $g/m^3$, and in some embodiments, from about 5 to about 20 $g/m^3$. The relative humidity may likewise range from about 30% to about 90%, in some embodiments from about 40% to about 85%, and in some embodiments, from about 50% to about 80%. The temperature of the humidified atmosphere may vary, such as from about 10° C. to about 50° C., in some embodiments from about 15° C. to about 45° C., and in some embodiments, from about 20° C. to about 40° C. In addition to a pretreatment step, the anode body may also be contacted with a humidified atmosphere in an intermediate treatment step, which occurs after contact with a manganese oxide precursor solution. The humidified atmosphere in the intermediate treatment step may have the same or different conditions than that of the pretreatment step, but is generally within the ranges noted above.

Regardless, once contacted with the precursor solution for the desired amount of time, the part is heated to a temperature sufficient to pyrolytically convert the precursor (e.g., manganese nitrate) to an oxide. Heating may occur, for instance, in a furnace at a temperature of from about 150° C. to about 300° C., in some embodiments from about 180° C. to about 290° C., and in some embodiments, from about 190° C. to about 260° C. Heating may be conducted in a moist or dry atmosphere. In certain embodiments, for instance, heating may be conducted in a humidified atmosphere, which may be the same or different than the atmospheres used in the aforementioned pretreatment and intermediate treatment steps, but generally within the conditions noted above. The time for the conversion depends on the furnace temperature, heat transfer rate and atmosphere, but generally is from about 3 to about 5 minutes. After pyrolysis, the leakage current may sometimes be high due to damage suffered by the dielectric film during the deposition of the manganese dioxide. To reduce this leakage, the capacitor may be reformed in an anodization bath as is known in the art. For example, the capacitor may be dipped into an electrolyte such as described above and then subjected to a DC current.

II. Terminations

The capacitor may also be provided with terminations, particularly when employed in surface mounting applications. For example, the capacitor may contain an anode termination to which the anode of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring again to FIG. 1, for example, the electrolytic capacitor 30 is shown as including an anode termination 62 and a cathode termination 72 in electrical connection with the capacitor element 33. Although it may be in electrical contact with any of the surfaces of the capacitor element 33, the cathode termination 72 in the illustrated embodiment is in electrical contact with the lower surface 39 via a conductive adhesive 90. More specifically, the cathode termination 72 contains a first component 73 that is in electrical contact and generally parallel with the lower surface 39 of the capacitor element 33. The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. Although not depicted in FIG. 1, the region 51 may possess a "U-shape" to further enhance surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, the conductive adhesive 90 may initially be applied to a surface of the cathode termination 72. The conductive adhesive 90 may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 is initially bent upward to the position shown in FIG. 1. Thereafter, the capacitor element 33 is positioned on the cathode termination 72 so that its lower surface 39 contacts the adhesive 90 and the anode lead 16 is received by the region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

III. Casing

The capacitor element is generally encapsulated within a casing so that at least a portion of the anode and cathode terminations are exposed for mounting onto a circuit board. As shown in FIG. 1, for instance, the capacitor element 33 is encapsulated within a casing 92 so that a portion of the anode termination 62 and a portion of the cathode termination 72 are exposed. The casing is typically formed from a thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof.

As a result of the present invention, the capacitor may exhibit excellent electrical properties even when exposed to high humidity levels (85% relative humidity or more). For example, the capacitor assembly may have an equivalence series resistance ("ESR") of less than about 50 ohms, in some embodiments less than about 25 ohms, in some embodiments from about 0.01 to about 10 ohms, and in some embodiments, from about 0.05 to about 5 ohms, measured at an operating frequency of 100 kHz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and uF*V is the product of the capacitance and the rated voltage. Such ESR and normalized leakage current values may even be maintained after aging for a substantial amount of time at high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at temperatures ranging from 50° C. to 250° C., and, in some embodiments from 70° C. to 200° C., and in some embodiments, from 80° C. to about 150° C. (e.g., 85° C.), and at a relative humidity level of 85% or more.

The present invention may be better understood with reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency may be 100 kHz and the temperature may be 23° C.±2° C.

Capacitance

The capacitance may be measured using a Hewlett-Packard Precision LCR meter with a 1.5 volt DC bias at an operating frequency of 120 Hz. The capacitance may be determined after reflow (0 hours), 48 hours, and 500 hours in a humid environment. After reflow, the capacitance may be measured at 20° C. and at a relative humidity of 59%. After 48 hours, the capacitance may be measured at 20° C. and a relative humidity of 56%. Finally, after 500 hours, the capacitance may be measured at 20° C. and a relative humidity of 52%.

Leakage Current

Leakage current ("DCL") may be measured using a leakage test set that measures leakage current at a temperature of about 25° C. and at the rated voltage (e.g., 4V) after 60 seconds.

EXAMPLE 1

A 10 V, 2.2 μF(M) capacitor was formed as follows. Initially, a tantalum powder (50,000 CV/g) was pressed to a size of 0.76×1.22×0.57 mm and density of 6 g/cm³, and an anode lead wire was embedded therein. The powder was sintered at 1475° C. and then anodized in 0.1 wt. % nitric acid at a formation voltage of 39.4 V. Once formed, the part was then left in an atmosphere having a humidity level of 8 g/m³ for 30 minutes at a temperature of 30° C. The part was then dipped in a solution for 3 minutes that contained manganese nitrate (1.09 specific gravity) and 1 wt. % polyalkylether. The part was left in an atmosphere having a humidity level of 8 g/m³ for 2 hours at a temperature of 30° C., and thereafter heat treated at 250° C. in an atmosphere having a relative humidity of 80%. Once the precoat layer was formed, the part was reformed and then dipped in a solution that contained 3,4-ethylenedioxythiophene, p-toluenesulfonate-iron, butanol, and water, Polymerization was conducted at a relative humidity level of 80%, and the part was thereafter washed and reformed. This process was repeated until two more times. Once the solid electrolyte was formed, the part was then dipped into a solution containing 2.5 wt. % (3-mercaptopropyl)trimethoxysilane and heat-treated at 130° C. for 10 minutes. Carbon and silver layers were applied as is known in the art. Thereafter, all surfaces of the part other than the bottom surface were treated with a polyorganosiloxane resin (Dow Corning™ JCR 6115) and heat-treated at 185° C. for 10 minutes. The capacitor was thereafter welded to a lead frame and encapsulated.

EXAMPLE 2

Capacitors were formed as described in Example 1, except that the polyorganosiloxane resin was not employed.

EXAMPLE 3

Capacitors were formed as described in Example 1, except that the (3-mercaptopropyl)trimethoxysilane was not employed. The capacitance of the parts of Examples 1-3 was then tested. The results are shown in the table below.

|  | Average Capacitance (Initial) | Average Capacitance (after 48 hrs) | Average Capacitance (after 500 hrs) |
| --- | --- | --- | --- |
| Example 1 | 2.30 µF | 2.41 µF | 2.40 µF |
| Example 2 | 2.29 µF | 2.40 µF | 2.34 µF |
| Example 3 | 2.30 µF | 2.43 µF | 2.23 µF |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
   a capacitor element that includes a sintered porous anode body, a dielectric that overlies the anode body, a solid electrolyte that overlies the dielectric, and a moisture barrier layer that overlies the solid electrolyte, wherein the solid electrolyte includes a conductive polymer and an organometallic coupling agent that contains an organic chain with at least one reactive group bonded to a metal atom, and further wherein the moisture barrier layer includes a hydrophobic elastomer, wherein the hydrophobic elastomer is a silicone elastomer, wherein the silicone elastomer is formed from a polydimethylsiloxane, polymethylhydrogensiloxane, dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, fluoro-modified polysiloxane, or a combination thereof;
   an anode termination that is in electrical connection with the anode body;
   a cathode termination that is in electrical connection with the solid electrolyte; and
   a resinous casing that encapsulates the capacitor element and leaves exposed at least a portion of the anode termination and the cathode termination.

2. The solid electrolytic capacitor of claim 1, wherein the organometallic coupling agent is an organosilane.

3. The solid electrolytic capacitor of claim 1, wherein the solid electrolyte contains a layer that includes the organometallic coupling agent and the conductive polymer.

4. The solid electrolytic capacitor of claim 1, wherein the solid electrolyte contains a layer that includes the organometallic coupling agent and another layer that includes the conductive polymer.

5. The solid electrolytic capacitor of claim 1, wherein the hydrophobic elastomer has a contact angle with water of about 90° or more, as determined in accordance with ASTM D7490-08.

6. The solid electrolytic capacitor of claim 1, wherein the hydrophobic elastomer has a water vapor transmission rate of about 150 grams per square meter per 24 hours or less, as determined in accordance with ASTM F-1249.

7. The solid electrolytic capacitor of claim 1, wherein the hydrophobic elastomer has a Young's modulus of about 5,000 kilopascals or less, determined at a temperature of about 25° C.

8. The solid electrolytic capacitor of claim 1, wherein the hydrophobic elastomer has a tensile strength of from about 1 to about 5,000 kilopascals, determined at a temperature of about 25° C.

9. The solid electrolytic capacitor of claim 1, wherein the anode body includes tantalum and the dielectric includes tantalum pentoxide.

10. The solid electrolytic capacitor of claim 1, wherein the conductive polymer is chemically polymerized.

11. The solid electrolytic capacitor of claim 1, wherein the conductive polymer is a substituted polythiophene.

12. The solid electrolytic capacitor of claim 11, wherein the substituted polythiophene is poly(3,4-ethylenedioxythiophene).

13. The solid electrolytic capacitor of claim 1, wherein a cathode coating overlies the solid electrolyte, the cathode coating containing a carbonaceous layer and silver layer.

14. The solid electrolytic capacitor of claim 1, wherein an anode lead extends from the anode body and is connected to the anode termination.

15. A solid electrolytic capacitor comprising:
   a capacitor element that includes a sintered porous anode body, a dielectric that overlies the anode body, a solid electrolyte that overlies the dielectric, and a moisture barrier layer that overlies the solid electrolyte, wherein the solid electrolyte includes a conductive polymer and an organometallic coupling agent that contains an organic chain with at least one reactive group bonded to a metal atom, and further wherein the moisture barrier layer includes a hydrophobic elastomer, wherein the moisture barrier layer contains a non-conductive filler, wherein the non-conductive filler is silica, wherein the silica contains $(CH_3)_n$—Si— groups, wherein n is an integer of 1 to 3;

an anode termination that is in electrical connection with the anode body;

a cathode termination that is in electrical connection with the solid electrolyte; and a resinous casing that encapsulates the capacitor element and leaves exposed at least a portion of the anode termination and the cathode termination.

16. The solid electrolytic capacitor of claim 15, wherein the organometallic coupling agent is an organosilane.

17. The solid electrolytic capacitor of claim 15, wherein the solid electrolyte contains a layer that includes the organometallic coupling agent and the conductive polymer.

18. The solid electrolytic capacitor of claim 15, wherein the solid electrolyte contains a layer that includes the organometallic coupling agent and another layer that includes the conductive polymer.

19. The solid electrolytic capacitor of claim 15, wherein the hydrophobic elastomer has a contact angle with water of about 90° or more, as determined in accordance with ASTM D7490-08.

20. The solid electrolytic capacitor of claim 15, wherein the hydrophobic elastomer has a water vapor transmission rate of about 150 grams per square meter per 24 hours or less, as determined in accordance with ASTM F-1249.

21. The solid electrolytic capacitor of claim 15, wherein the hydrophobic elastomer has a Young's modulus of about 5,000 kilopascals or less, determined at a temperature of about 25° C.

22. The solid electrolytic capacitor of claim 15, wherein the hydrophobic elastomer has a tensile strength of from about 1 to about 5,000 kilopascals, determined at a temperature of about 25° C.

23. The solid electrolytic capacitor of claim 15, wherein the anode body includes tantalum and the dielectric includes tantalum pentoxide.

24. The solid electrolytic capacitor of claim 15, wherein the conductive polymer is chemically polymerized.

25. The solid electrolytic capacitor of claim 15, wherein the conductive polymer is a substituted polythiophene.

26. The solid electrolytic capacitor of claim 25, wherein the substituted polythiophene is poly(3,4-ethylenedioxythiophene).

27. The solid electrolytic capacitor of claim 15, wherein a cathode coating overlies the solid electrolyte, the cathode coating containing a carbonaceous layer and silver layer.

28. The solid electrolytic capacitor of claim 15, wherein an anode lead extends from the anode body and is connected to the anode termination.

\* \* \* \* \*